United States Patent [19]
Barker et al.

[11] 4,393,108
[45] * Jul. 12, 1983

[54] SIMULATED CERAMIC TILE

[75] Inventors: John C. Barker, Cowansville; Ivan P. McLaughlin, Dunham, both of Canada

[73] Assignee: J. J. Barker Company Limited, Canada

[ * ] Notice: The portion of the term of this patent subsequent to Oct. 2, 1996, has been disclaimed.

[21] Appl. No.: 340,992

[22] Filed: Jul. 13, 1981

Related U.S. Application Data

[63] Continuation of Ser. No. 52,008, Jun. 25, 1979, abandoned, which is a continuation-in-part of Ser. No. 808,662, Jun. 21, 1977, Pat. No. 4,169,907, which is a continuation-in-part of Ser. No. 550,875, Feb. 19, 1975, abandoned.

[30] Foreign Application Priority Data

Nov. 15, 1974 [CA] Canada .................................. 213914

[51] Int. Cl.³ ........................... B32B 3/00; B32B 3/10

[52] U.S. Cl. ........................................... 428/44; 106/2; 427/258; 427/262; 427/264; 427/270; 427/302; 427/333; 428/151; 428/156; 428/163; 428/167; 428/204; 428/336; 428/447; 428/448; 428/201; 428/172

[58] Field of Search ............... 428/163, 167, 156, 172, 428/151, 204, 447, 448, 336, 423, 201, 44; 106/2; 427/257, 264, 270, 302, 333, 262, 258

[56] References Cited

U.S. PATENT DOCUMENTS

| | | | |
|---|---|---|---|
| 1,753,611 | 4/1930 | Mougers | 427/417 |
| 1,881,803 | 10/1932 | Mattison | 428/167 |
| 2,073,624 | 3/1937 | Casto | 427/417 |
| 2,832,695 | 4/1958 | Compton | 428/172 |
| 3,293,094 | 12/1966 | Nairn et al. | 156/79 |
| 3,655,421 | 4/1972 | Long | 428/207 |
| 3,677,794 | 7/1972 | Jeff et al. | 428/155 |
| 4,017,658 | 4/1977 | Bomboire | 428/159 |
| 4,097,635 | 6/1978 | Hernandez et al. | 428/172 |
| 4,169,907 | 10/1979 | Barker et al. | 427/264 |
| 4,233,343 | 11/1980 | Barker et al. | 427/264 |

*Primary Examiner*—George F. Lesmes
*Assistant Examiner*—E. Rollins Buffalow
*Attorney, Agent, or Firm*—Bacon & Thomas

[57] ABSTRACT

A decorative simulated ceramic tile comprises a substrate having a surface coated with an under-coat effective to provide a colored, printable base; an inked layer comprising a layer of colored ink lines of a silicone-containing drying ink forming a printed pattern on said printable base, said printed pattern being clearly visible; and a coloring pigment-containing top coat of a hard resinous, film-forming material; said top coat having a variable height thickness defining a contour of valleys, hills and plains, wherein the intensity of color in the top coat varies with the variation in the contour, the said valleys occurring over said ink lines such that the color of the ink is not obscured, and the hills lying adjacent said ink lines, said color in the top coat providing a contrast with the color in the under-coat and with the color in the printed pattern.

15 Claims, 7 Drawing Figures

SIMULATED CERAMIC TILE

CROSS-REFERENCE TO RELATED APPLICATIONS

This application is a continuation of application Ser. No. 52,008, filed June 25, 1979, now abandoned, which is a continuation-in-part of Ser. No. 808,662, filed June 21, 1977, now U.S. Pat. No. 4,169,907, which was a continuation-in-part of abandoned Ser. No. 550,875, filed Feb. 19, 1975, now abandoned.

BACKGROUND OF THE INVENTION (a) Field of the Invention

This invention relates to a decorative simulated ceramic article and its manufacture; more especially the invention is concerned with panels defining a plurality of simulated ceramic tiles.

(b) Description of Prior Art

Individual decorative ceramic tiles may be made by hand painting a design on ceramic substrate made by fusing earthy raw materials in which silicon, silicon oxide and silicates predominate; a transparent glaze coating is applied over the decorated substrate and the glaze is fired in an oven to produce the tile. The glaze coating forms an irregular surface since the substrate is not completely flat due to the hand painted design.

Methods are also known for the screen stencil application of ceramic decorations to ceramic objects, one such method being described in Canadian Pat. No. 546,597 of Christian C. Jessen, issued Sept. 24, 1957.

In U.S. Pat. No. 3,811,915, Burrel et al, there is disclosed a three-dimensional simulated wood grain product and its manufacture; a silicone-containing ink is employed to repel the top coat, however the top coats employed are colourless, transparent coatings which will not produce a ceramic effect. In particular Burrell et al are concerned with the production of a three-dimensional feel and appearance in the surface of simulated articles so as, for example, to give the three-dimensional sensation that natural wood gives when touched.

Simulated articles which Burrell et al were seeking to improve were of a completely flat appearance. In these prior articles the coloured pattern, for example the wood grain, was printed on the substrate in successive printing stages on a base, in order to produce the appropriate different colours and patterns for the individual colours. A colourless, transparent top coat was then applied to the coloured printed base as a protective surface for the coloured printed pattern. The top coat was necessarily colourless since a coloured top coat would mask the carefully printed coloured pattern produced by the several printing stages.

Thus in the simulated articles which Burrell et al sought to improve, a colourless top coat composition was employed solely to produce a protective coating for the printed pattern.

Burrell et al made a significant advance especially in the art of similating wood grain by employing the conventional colourless top coat compositions not only as protective coatings but also to produce a three-dimensional feel and appearance, without mechanical embossing of the protective top coat surface.

In U.S. Pat. No. 1,753,616, Mougey there is described the use of a thin clear lacquer or thin lacquer containing pigment as a top coat for a coloured cellulose nitrate main coat on an automobile body; the purpose of the lacquer top coat is described as being to eliminate scratches, orange peel effects, "blushes", or other surface irregularities that would otherwise be visible. Mougey indicates that the presence of pigment in the thin lacquer improves the durability of the main coat. It is clear that the pigmented main coat is the source of colour in the automobile body and when a pigmented thin lacquer is employed by Mougey, the pigment in the thin lacquer is the same as the pigment in the main coat. Indeed when the main coat is of a plurality of colours Mougey indicates that a colourless thin lacquer must be employed or the different colours must be masked, as with masking tape, to avoid application thereto of a pigmented thin lacquer of a different colour.

In U.S. Pat. No. 2,073,624, Casto, there is described a method of simulating natural materials, such as wood and stone, employing a bright metal substrate as the base in order to obtain the lustre or sheen which is characteristic of the natural material. Casto avoids the use of an opaque base coat but employs a top coat and a base coat which are clear or slightly pigmented to render them translucent, with an intermediate inked design layer which substantially covers the base coat so that the metallic character of the base surface is fully concealed; in particular the printed design is applied so as to clearly expose only small areas of the underlying coated surface. Thus the translucent or transparent top coat of Casto is employed with the translucent or transparent base coat in conjunction with a printed design which substantially covers the base, in order to conceal the metallic character of the base while retaining a sheen or lustre emanating from the metallic base.

SUMMARY OF THE INVENTION

The present invention has as an object to provide simulated ceramic tiles, which in appearance can hardly be distinguished from ceramic tiles; and which have the advantages of being lightweight, less expensive than ceramic tiles, and that they can readily be formed as an integral panel, each panel defining a multiplicity of tiles; which can be readily adhered as a single unit to a wall or other surface to be decorated.

It is a further object of the invention to provide ceramic tiles which can be multi-coloured, and have the characteristic non-smooth feel and appearance of conventionally made ceramic tiles.

It is a further object of the invention to provide a method of producing a simulated ceramic tile; and more particularly a method of producing a panel defining a multiplicity of simulated ceramic tiles.

According to the invention there is provided a decorative simulated ceramic tile comprising a substrate having a surface coated with an under-coat effective to provide a coloured, printable base; an inked layer comprising a layer of coloured ink lines of a silicone-containing ink forming a printed pattern on said printable base, said printed pattern being clearly visible; and a colouring pigment-containing top coat of a hard resinous, film-forming material; said top coat having a variable height thickness defining a contour of valleys, hills and plains, wherein the intensity of colour in the top coat varies with the variation in the contour, said valleys occurring over said ink lines such that the colour of the ink is not obscured, and the hills lying adjacent said ink lines, said colour in the top coat providing a contrast with the colour in the under-coat and with the colour in the printed pattern.

According to one embodiment of the invention there is provided a panel defining a plurality of such decorative simulated ceramic tiles. The panel suitably comprises a substrate having a surface coated with an undercoat effective to provide a coloured, printable base; a printed ink layer comprising a layer of coloured ink lines of a silicone-containing ink defining a plurality of individually complete designs on said printable base, each of said designs being associated with a defined rectangular area, said layer of ink lines being clearly visible; and a colouring pigment-containing top coat of a hard resinous, film-forming material; said top coat having a variable depth and defining a contour of valleys, hills and plains, wherein the intensity of colour in the top coat varies with the variation in the contour; said valleys occurring over said ink lines such that the colour of the ink is not obscured, and the hills lying adjacent said ink lines; said colour in the top coat providing a contrast with the colour in the under-coat and with the colour in the printed pattern.

In another aspect of the invention there is provided a method of forming a panel defining a plurality of decorative simulated ceramic tiles comprising:

(a) scoring a flat surface of a substrate to form a plurality of grooves defining a plurality of rectangular areas, (b) applying to the grooved surface a coating of a urethane-forming composition, (c) rapidly curing the wet coating in the presence of a vapour phase catalyst such that a continuous urethane coating is formed on the grooved surface without exposure of the surface at the upper wall of the grooves and with retention of unfilled grooves to provide a coloured, printable base, (d) printing on said printable base a layer of ink lines of a coloured ink containing 0.75 to 5% by weight of an organic silicone oil; said ink lines defining a plurality of individually complete designs on said base, each of said designs being associated with one of said rectangular areas, (e) applying to said printable base, over said layer of ink lines, a liquid top coat composition of a resinous, film-forming material in a volatile organic vehicle, said top coat composition containing from 0.75% to 2.0% of a colouring pigment based on the weight of the top coat composition, (f) allowing said silicone-containing ink to repel said liquid to form ridges of the liquid adjacent the ink lines, and leaving said ink lines clearly visible, (g) drying and baking the substrate to fix said top coat as a hard, pigment-containing, resinous top coat defining a contour of valleys, hills and plains, wherein the intensity of colour in the top coat varies with the variation in the contour, said valleys occurring over the ink lines such that the colour in the ink is not obscured; said colour in the top coat providing a contrast with the colour in the under-coat and with the colour in the printed pattern to simulate a ceramic appearance.

DESCRIPTION OF PREFERRED EMBODIMENTS

The ceramic tile may be formed in a method comprising applying to a surface of a substrate, an under-coat effective to provide a coloured, printable base; printing on the printable base a pattern composed of ink lines of a coloured ink containing 0.75 to 5% by weight of an organic silicone oil; allowing the ink to dry; applying to the printable base, over the printed pattern, a colouring pigment-containing liquid top coat composition of a resinous, silicone-free, film-forming material in a volatile organic vehicle, the top coat composition containing from 0.75% to 2.0% of colouring pigment based on the weight of top coat composition; allowing the silicone-containing ink to repel the liquid to form ridges of the liquid adjacent the printed pattern, the printed pattern being clearly visible, and subsequently drying and baking the substrate to fix the liquid material as a hard, colouring pigment-containing, resinous top coat defining a contour of valleys, hills and plains, wherein the intensity of colour in the top coat varies with the variation in the contour, the valleys occurring over the ink lines such that the colour of the ink is not obscured; the colour in the top coat providing a contrast with the colour in the under-coat and with the colour in the printed pattern to simulate a ceramic appearance.

When the liquid top coat is applied to the inked pattern the silicone oil in the ink repels the liquid top coat and ridges of the liquid top coat are formed adjacent the inked pattern. Thus in contour, the inked pattern defines valleys, with hills of top coat adjacent the valleys; the large non-inked areas define plains of top coat between the hills. The drying and baking steps fix the liquid top coat as a hard resinous solid coating which retains this contour of valleys, hills and plains.

This three-dimensional contour formed in the top coat produces the ceramic feel and appearance. It is, however, essential in obtaining the ceramic appearance, that the top coat contain a pigment; the variation in contour from the relatively flat plains sloping up to the hills results in varying colour intensities in the top coat, which forms a part of the ceramic appearance; a non-pigmented, transparent top coat will not produce the ceramic effect. On the other hand, the top coat may be of a pigmented transparent resinous material, such that the colour of the under-coat in the non-inked, plain areas is visible, the colour varying in intensity in the hill areas and the slopes thereof.

The ink may be any conventional printing ink which will dry rapidly, for example, in a time of about one minute. Such inks comprise a viscous to semi-solid suspension of finely divided pigment in a liquid vehicle, and may dry by evaporation of a volatile solvent vehicle, or by oxidation and polymerization of a drying oil or resin.

Particularly preferred inks are drying inks based on homo and copolymers of vinyl chloride, particularly copolymers of vinyl chloride and vinylbutyl ether, with ketones as the vehicle; the pigments for the ink are conventional being typically inorganic oxides and salts of the transition metals; the pigments are selected according to the colour of ink desired.

The ink suitably contains 0.75 to 5%, preferably about 3%, by weight of an organic silicone oil; a particularly preferred class of oils being the phenyl methyl siloxanes. Less than about 0.75% of oil does not produce a sufficiently significant repelling of the top coat to create the ceramic effect; the greater the content of silicone oil, the greater is the pattern formation, or forming of ridges, in the top coat, in terms of speed. However, a silicone oil content greater than about 5% by weight is less preferred since it may deleteriously affect the adherence of the top coat, and is in any case, unnecessary.

The ink pattern of the silicone containing ink should be composed of ink lines. If whole areas are inked then an uneven repelling is obtained and the inked areas are not properly defined by ridges of top coat; this possibly arises from the occurrence of localized concentrations of silicone oil in a large inked area.

It has been found that an ink line width of 1/16 to 3/16 inches in the ink pattern shows good results with a width of ⅛ inches being especially preferred; the lower limit of the width is dictated by the need to have a clearly visible pattern and the desire to simulate a hand painted ceramic; if the ink lines are too fine the pattern will be less discernible to the eye. The area of the printable base covered by ink lines represents a relatively small area of the printable base surface and will generally be from 5 to 30%, preferably 10 to 20% of the total area of the printable base. If the area of the printable base covered by the ink lines is outside the general range then the desired ceramic appearance may not be obtained.

Of course, the printed pattern may include inked areas of a conventional ink not in the form of lines, and these inked areas will contribute to the overall ceramic appearance.

The liquid top coat is suitably applied to a wet thickness of about 4 to about 5 mils. This thickness of top coat results in ridges adjacent the inked pattern of about 8 mils wet height thickness, which dry to form hills having a height thickness of about 4.5 to 5 mils. The height thickness of the hills of the top coat should be at least about 4 mils to obtain a discernible ceramic feel and appearance. Although the top coat is repelled from the ink pattern a very small coating thickness of top coat remains on the ink pattern, however, this is less than 1 mil in thickness, and the colour of the ink is not obscured by this small remaining thickness of top coat. It is, of course, essential that the pattern of ink lines be clearly visible when the top coat is repelled by the ink pattern.

The top coat may be any resinous film-forming material, containing a pigment, in a volatile organic vehicle; such resinous materials are well known for producing finishing surfaces of plastic material.

The top coats employed are silicone-free, by which is meant that the top coats contain little if any silicone when compared with the silicone-containing ink, however, the top coat may contain a small amount of silicone, which is a conventional additive to top coat compositions. Silicones have good lubricity and are employed conventionally in top coat compositions to render the finished coating slippery, thereby improving the resistance to wear. The top coats may thus include the conventional amounts of silicone for this purpose, however, it will be understood that the silicone content of the top coat should not be such as to significantly hinder or diminish the repelling effect of the silicone in the ink. Such top coat compositions are considered to be silicone-free in the context of this invention.

Typical materials for the top coat include those based on melamine and alkyd resins. Conventional top coat resin compositions are colourless and transparent when used to provide a protective surface over a printed pattern. The present invention represents a departure from the prior systems in that a small amount of pigment is incorporated into the otherwise colourless, transparent resin top coat composition to give it colour and to contrast with the colour in the ink lines and the colour in the under-coat. A particularly suitable resin material is a two component system based on a polyester resin and oxirane modified ester resin.

Suitable volatile vehicles include aromatic solvents and glycols; a particularly preferred solvent for the preferred resin system is xylol.

Any pigment compatible with the resin system can be employed in the top coat; the particular pigment chosen being dependent on the colour desired.

The pigment is only needed in small amounts to provide colour in the top coat. If there is too little pigment the ceramic appearance will be lost since the top coat will appear colourless; the upper limit depends on the particular colour of the pigment and the colour of areas of the base coat which are not inked with the silicone-containing ink, since if the colour in the top coat is too intense it will mask the background colour; and this may be undesirable; this will depend on the particular design. Suitably it is found that 0.75% to 2.0% and preferably about 1.5% by weight of pigment colouring based on the total weight of the liquid top coat composition, is sufficient to produce the ceramic effect, while avoiding the masking of background colours.

The pigments employed in the under coat, ink and top coat are selected so that there is a discernable contrast between the three. This may be achieved either by employing completely different colours in the under coat, ink and top coat, or by employing different shades of the same colour, or by employing two different shades of one colour with a completely different colour. For example it is especially preferred to use a white pigmented top coat; in this case the under-coat might be a pale blue and the ink lines a deep blue; or the ink lines might be yellow and the under-coat green; a third possibility is that the under-coat, ink lines and top coat could be different shades of the same colour, for example, different shades of blue. It is of course important that there be adequate and discernable differentiation in the colours or shades in order to produce a contrast in the colours and provide the ceramic appearance.

It is found that an especially pleasing appearance is obtained by employing different shades of the same colour for the under coat and ink lines, in conjunction with a white pigmented top coat, the under coat being a pale shade and the ink lines being a deep shade of the same colour.

An advantage of employing a white pigmented top coat in this manner is that the colour of the under coat is observed in different shades, thus enhancing the ceramic appearance. The hills of the top coat formed are substantially opaque and obliterate the underlying under coat. The top coat between the ridges in the non-inked areas, which forms the plains is only partially opaque or in other words is translucent and the colour of the under coat is visible therethrough as a lighter shade than the exposed areas of under coat in the valleys adjacent the ink lines where the top coat is repelled. As indicated previously there may be a very small coating thickness of top coat in the valleys, of less than 1 mil thickness, however, this small thickness is substantially transparent so that the ink lines and the under coat adjacent the ink lines are clearly visible.

The pigment content in the top coat composition and the applied thickness of liquid top coat composition are important in obtaining the required repelling to expose the ink line pattern and the adjacent coloured under coat, and to provide a resinous top coat which is transparent over the valleys, opaque in the hills and translucent in the plains.

By employing a pigment content of 0.75 to 2.0% by weight in a wet thickness of about 4 to 5 mils the required variation in the top coat can be obtained. If more than about 2.0% by weight of the pigment is employed, then the repelling action is affected. It is believed that the weight of the pigment particles slows down the repelling action and if the weight of the pigment particles is too high no satisfactory repelling of the liquid top coat composition is obtained. Lowering the viscosity of the liquid top coat composition does not appear to overcome the problem of poor repelling when the pigment content is increased, so that it appears to be the content of pigment particles which is significant.

The pigment content may also be expressed on a volume basis and in this case suitably comprises from 0.2 to 0.5%, preferably about 0.4%, by volume of the liquid top coat composition.

It will be understood that the invention is not restricted to any particular colour combinations and that the term "colour" includes white and black as well as intermediate grey colours in addition to the more conventional spectral colours such as blue and yellow.

The liquid top coat for application to the inked substrate suitably has a content of the resinous material of 50% to 70% by weight, with about 65% being preferred. The top coat should remain liquid for a time long enough to allow the silicone oil in the ink to repel the top coat and form the ridges.

When the volatile vehicle of the liquid top coat composition has been volatized the resinous top coat remaining contains about 1 to about 4%, preferably about 2.25 to 2.5%, by weight of pigment, based on the weight of the non-volatile part of the liquid top coat composition.

The top coat may be applied to the substrate by conventional means, for example, spraying or curtain coating, the latter being preferred.

It is found to be especially advantageous to heat the substrate after the ink pattern has been printed and before application of the liquid top coat composition. This resuls in a more rapid drying of the ink and surprisingly improves the repelling effect of the silicone in the ink so that the liquid top coat composition is repelled quickly and uniformly from the ink lines. This was a surprising result since it might have been expected that the heat from the substrate would hinder the pull-away or drawing back of the liquid composition from the ink lines by prematurely initiating or accelerating curing of the resin in the liquid composition. In this respect it should be noted that it is not appropriate to heat the liquid top coat composition directly prior to its application to the printed surface of the substrate, since such heating results in the premature curing of the resin material.

By employing this preferred pre-heating of the substrate surface prior to application of the liquid top coat composition the formation of the contour commences in 7 to 10 seconds whereas if the substrate is not preheated, formation of the contour commences only after 10 to 14 seconds. In a continuous in-line process this permits a higher through-put or a shorter distance between the inking and the application of the liquid top coat composition.

Thus, completely unexpected advantages are obtained in a preferred embodiment of the invention in which the substrate is heated to an elevated temperature after the printing of the pattern of ink lines and prior to the application of the liquid top coat composition.

In accordance with this especially preferred embodiment the printing of the ink lines is carried out at room temperature (about 70° F.) whereafter the substrate is heated to a surface temperature of about 90° F. to 130° F., preferably about 100° F. to 120° F. and the liquid top coat composition is applied to the printed surface of the heated substrate. The substrate may be conveniently heated by passing it through an infrared oven for about 10 to 15 seconds.

Heating of the substrate after the ink pattern has been printed has the additional advantage that drying of the ink is accelerated and more efficient. This is especially important on a continuous in-line process where the substrate is continuously moved through successive stages of the process, since if the ink pattern is not dry, bleeding into the liquid top coat may occur.

When the desired contour is obtained in the top coat it is fixed by evaporation of the solvent, followed by baking to harden the resinous material; in one embodiment the drying stage comprises exposing the top coat to a temperature of 200° to 250° F. for about 30 seconds; and this drying stage may be followed by a baking at about 250° F. for 2.5 to 3 minutes. Alternatively the solvent may be evaporated by allowing the substrate with top coat to stand for about 5 minutes in air; this time period may be shortened by increasing the temperature, however, problems occur in some instances if the drying temperature rises above about 200° to 250° F. with a temperature of about 140° F. being particularly suitable. If the top coat is heated above about 200° to 250° F. during the drying stage there is a danger of bubbling and leaching of the colour.

When the substrate surface is pre-heated prior to application of the liquid top coat composition the heat of the substrate surface initiates the evaporation or vaporization of the solvent in the liquid composition, and higher temperatures can then be employed in the curing stage in which residual solvent is removed, without danger of bubbling and leaching of the colour. In this case the curing temperature may be in the range of 250° F. to 325° F. and preferably the curing is carried out in an oven having a plurality of stages in which the temperature increases from the inlet end to the outlet end. The use of higher temperatures in the curing stage results in a harder resin coating which is much preferred.

The substrate is suitably a non-metallic porous substrate and particularly preferred is a hard-board sheet, although equivalent wood based sheets, for example, particle board can also be used. Non-wood based porous sheets, for example, plaster board or sheets of gypsum can also be employed. It will be evident that the substrate might be selected from a variety of materials which are self-supporting, and in sheet form, with the appropriate physical characteristics.

In the case of porous substrates the under-coat functions to seal the substrate surface and to provide the coloured printable base.

In a particularly advantageous and preferred embodiment the substrate comprises a flat hardboard panel 4 ft. by 8 ft. On such panel there can be defined eight rows of sixteen, six inch square tiles, with a narrow margin between adjacent tiles; or there can be defined twelve rows of twenty-four, four inch square tiles with a narrow margin between adjacent tiles. In one embodiment the narrow margin is defined by a silicone-containing ink layer in the form of ink lines, dividing the panel into six inch squares; or four inch squares; in this way the margin forms a depressed zone or valley corresponding to the depressed zone which occurs between adjacent tiles when conventional tiles are secured to a wall.

In another embodiment the narrow margin can be defined by a groove cut in the flat hardboard panel. In this case the groove can be formed in a number of ways. For example, the grooves in one direction can be formed simultaneously by a plurality of cutting elements mounted in parallel spaced apart relation, beneath which the board is conveyed, whereafter the board is turned through 90° and passed beneath a second set of cutting elements. The cutting elements may comprise, for example, chisel elements or circular cutting elements. Conveniently the grooves may have a width of 1/16 to ¼ and preferably about ⅛ inch, and a maximum depth of 1/64 to 3/64 inch.

There can thus be produced a light-weight panel of 128 tiles or 228, which can be readily secured by adhesive to a wall or other surface to be decorated. In this way a wall can be given a tiled surface far more quickly than when each tile is secured individually on the wall. Furthermore, utilizing the panels the wall can be more readily fitted and a full panel can be easily cut to provide an appropriate size panel to complete the covering of the wall. It will be appreciated that these figures are given only by way of example and tiles of different dimensions and panels of a different size could also be employed.

The under-coat for the hardboard substrate is of a conventional kind and serves to seal the pores of the hardboard surface and provide a coloured printable base surface. Conveniently the under-coat may be made up of two separate coatings; a lower fill coat to seal the pores and an upper base coat to provide a coloured printable base. Such coatings are well known in the art and may suitably be applied to the substrate by roller coating techniques. The fill coat is suitably applied by reverse roller coating and dried in a hot air oven at 150° F. for one minute; advantageously the fill coat surface is sanded to make it smooth before application of the base coat. The base coat is suitably applied by a curtain coater and dried in a hot air oven at about 375° F. for 1.5 to 2 minutes.

In the particular embodiment in which the rectangular tiles are defined by a groove cut in the substrate, for example, the hardboard panel, it is desirable to avoid filling the groove with the undercoat comprising the lower fill coat and the upper base coat, and in particular to avoid exposure of the substrate.

When the fill coat and base coat are individually applied to the grooved substrate the wet coatings flow downwardly along the walls of the groove, thus exposing the substrate at an upper portion of the groove walls, and partially filling the groove thereby lessening the desired visible depression between the tiles in the panel.

In order to avoid this it is necessary to cure the wet coatings quickly to avoid such downward flow in the groove.

This may be achieved in accordance with an especially preferred embodiment by employing as the fill coat and base coating polyurethane-forming coating composition, which can be cured with a vapour phase amine catalyst in a very short period, typically 5 to 25 seconds. In general a coating of this kind, applied in a wet thickness of 1.5 mils can be cured, in a curing chamber, with a vapour phase amine catalyst, in about 15 seconds.

In this way the grooved board can be successfully coated so as to provide a complete coating of the board surface, without exposure of the board at the upper walls of the grooves, and without significant filling of the grooves i.e., retention of unfilled grooves.

As the coating composition employed as base material for the fill coat and base coat and which are curable by a vapour phase amine catalyst there may be employed, for example, the coating materials described in Canadian Pat. Nos. 816,762; 903,944 and 1,005,943, the disclosures of which are herein incorporated by reference. Such compositions will additionally include an appropriate pigment.

Conveniently, there may be applied a fill-coat to seal the pores of a porous substrate, of a urethane-forming composition, which suitably is pigmented, in a wet thickness of about 1 to 2.5, preferably 1.25 to 1.75 and more preferably about 1.5 mils; after rapidly curing in the presence of a vapour phase catalyst a base-coat of a pigmented urethane-forming composition is applied in a wet thickness of about 1 to 2.5, preferably 1.25 to 1.75 and more preferably about 1.5 mils which is similarly rapidly cured in the presence of a vapour phase catalyst to provide a coloured, printable base.

The wet fill-coating and the wet base coating are rapidly cured as described above to avoid exposure of the underlying surface particularly adjacent the groove upper walls, and to avoid the grooves being filled with the coating material.

The curing with the vapour phase catalyst may in particular be carried out as described in U.S. Pat. Nos. 3,851,402 and 3,931,684 and in U.S. patent application Ser. No. 27,914 filed Apr. 5, 1979, now U.S. Pat. No. 4,294,021, Turnbull et al entitled "Method and Apparatus for Curing of Articles", the disclosures of which are herein incorporated by reference.

The amine catalyst is suitably a tertiary amine, preferably triethylamine.

While the method has been described in terms of forming a single ink pattern of a silicone-containing ink, it will be readily understood that additional inking patterns could be employed, utilizing silicone-free drying inks to obtain a multiplicity of colours in the tile. In this case the silicone-containing ink is desirably applied as the final inking stage to avoid possible interaction between silicone-containing ink and non-silicone-containing ink and to avoid the possibility of transfer of silicone from the silicone-containing ink to applicators for the non-silicone-containing inks.

The ink patterns can be formed by conventional ink printing techniques where the substrate is not required to be flexible including silk screen printing, and offset roller printing.

BRIEF DESCRIPTION OF DRAWINGS

The invention is illustrated in preferred embodiments by reference to the accompanying drawings in which.

DESCRIPTION OF PREFERRED EMBODIMENTS

Figure 1:
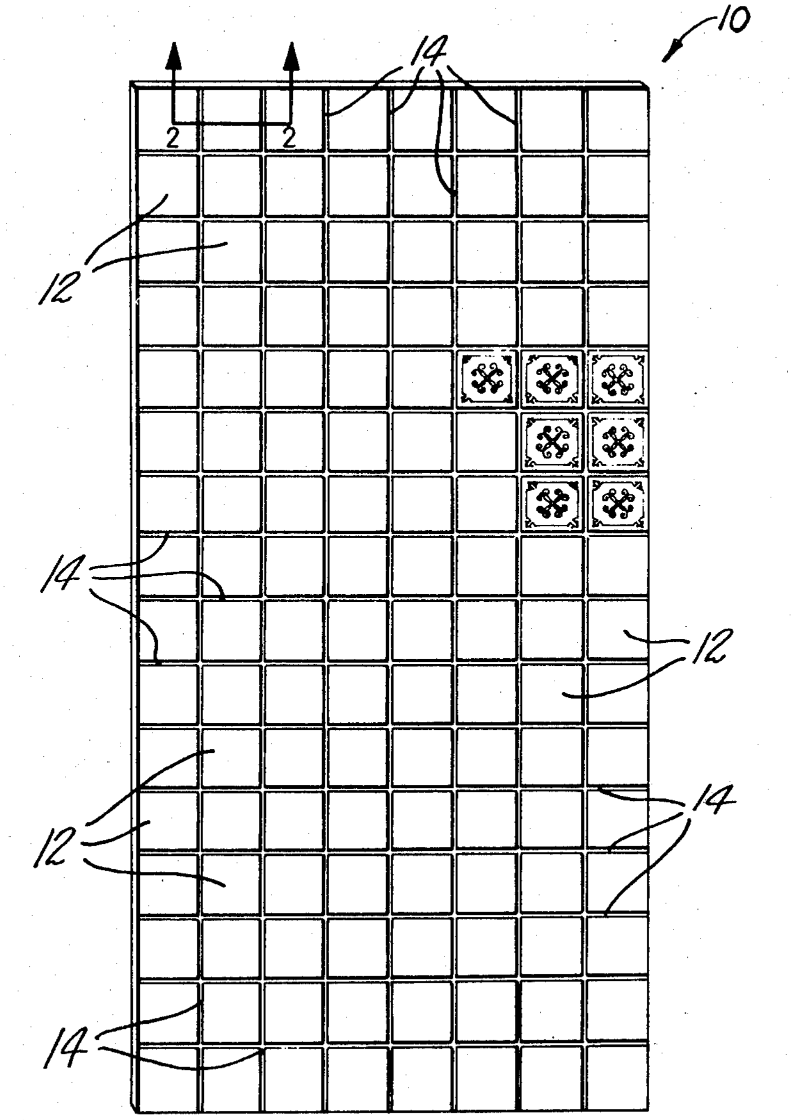
FIG. 1 illustrates schematically a hardboard panel defining a plurality of simulated ceramic tiles.

With reference to FIG. 1 there is illustrated a hardboard panel 10 defining a plurality of simulated ceramic tiles 12, with a narrow inked margin 14 between adjacent tiles 12; a design has been shown on certain of the tiles 12 by way of illustration.

Figure 2:
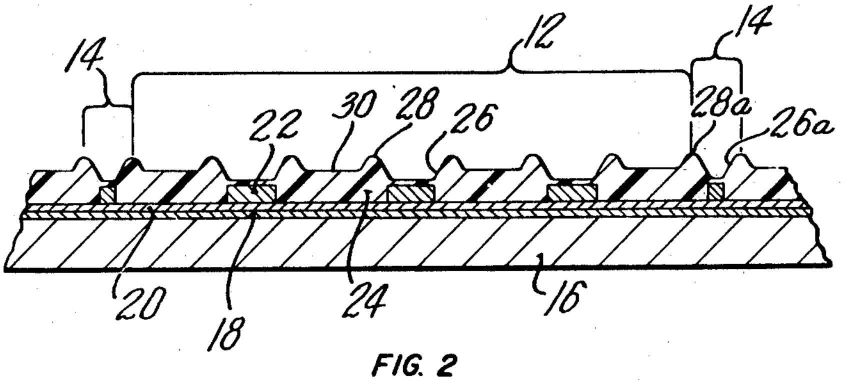
FIG. 2 illustrates a cross-section on the line 2—2 of FIG. 1, FIGS. 3, 4 and 5 illustrate examples of designs which can be formed in the simulated ceramic tiles of the invention.
Figure 3:
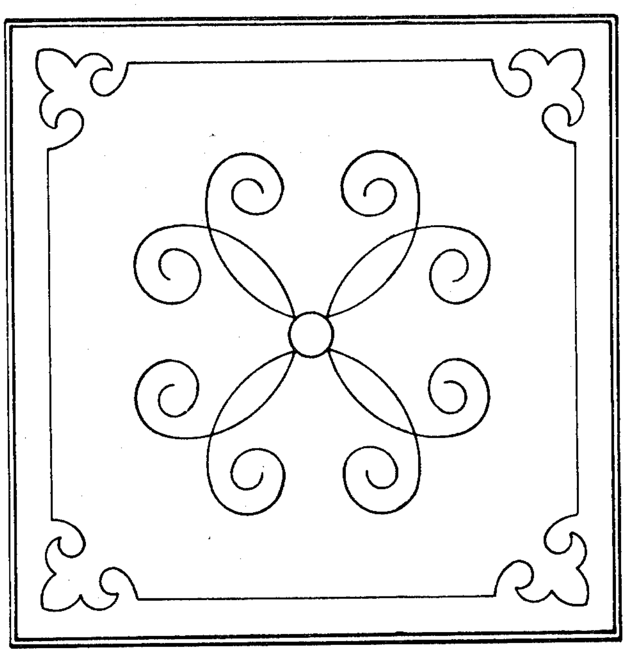
Figure 4:
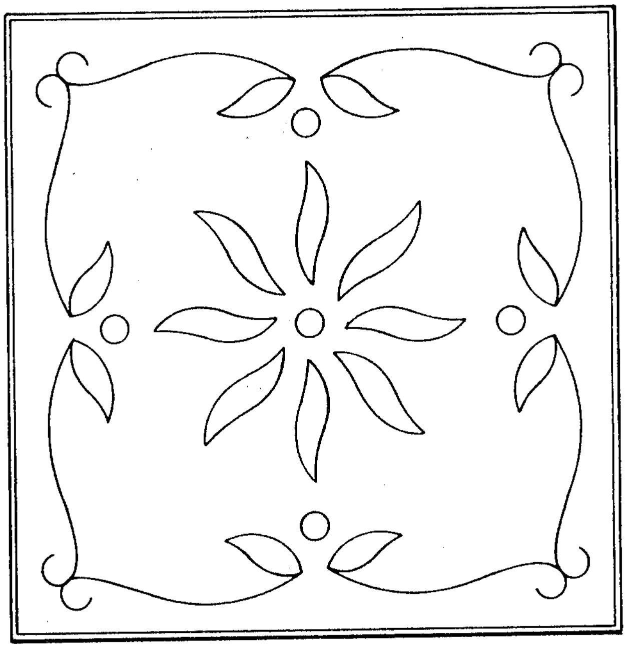
Figure 5:
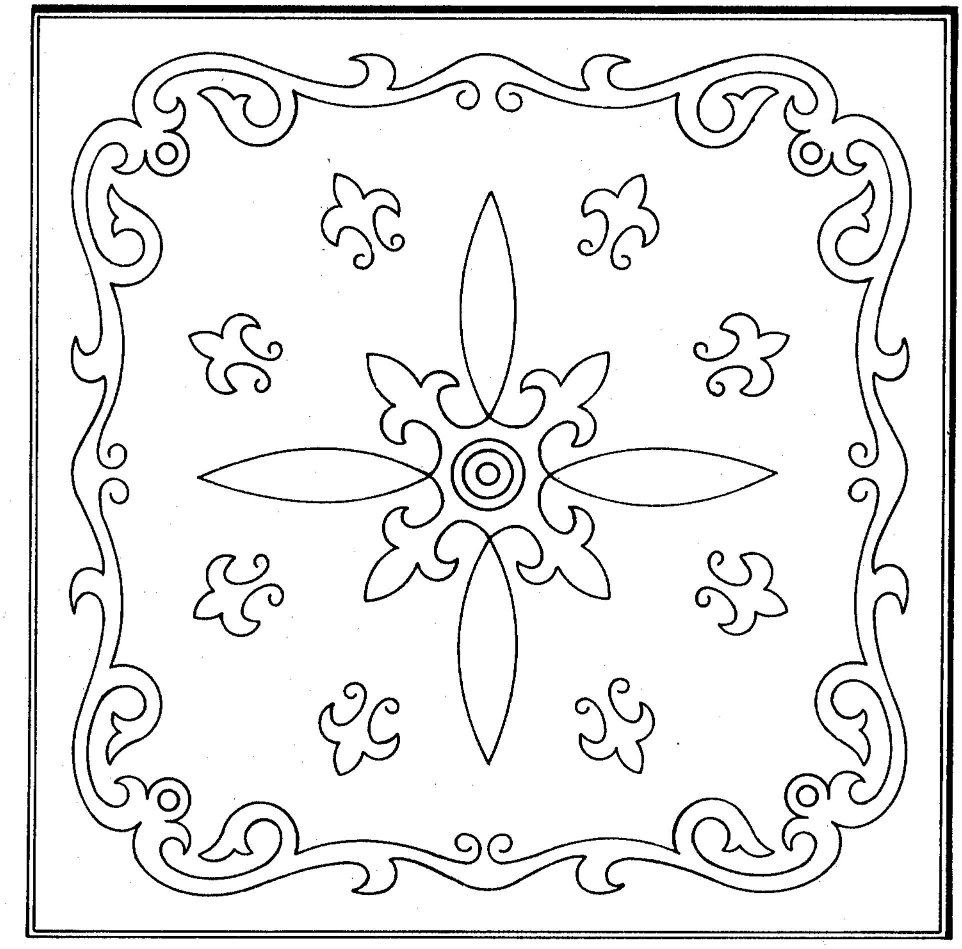

With reference to FIG. 2 there is illustrated a cross-section of a tile 12 comprising a hardboard substrate 16 defined by a portion of the panel 10 of FIG. 1; a sanded fill coat 18 and coloured base coat 20. An ink pattern of inked portions 22 is printed on base coat 20, the inked portion 22 comprising a silicone oil-containing drying ink. A hard pigmented top coat 24 provides a contoured surface defining valleys 26 over inked portions 22; hills 28 adjacent inked portions 22 and plains 30 between hills 28. The tile 12 terminates at a hill 28*a* sloping into a valley 26*a* over inked margin 14.

Figure 6:
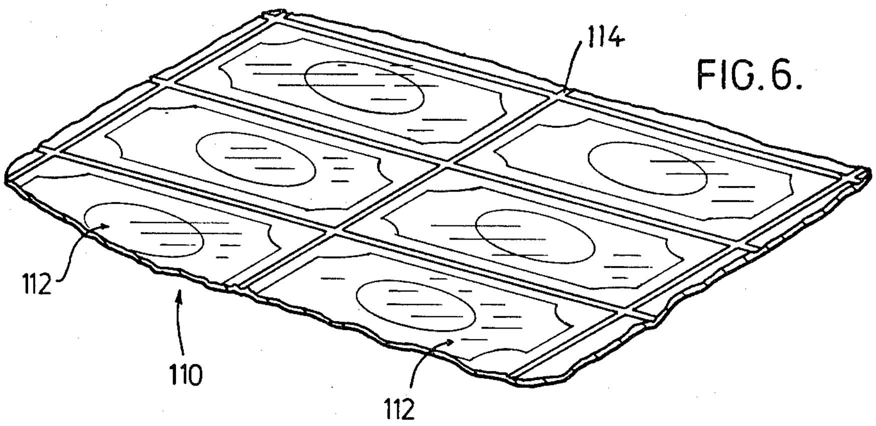
FIG. 6 illustrates schematically a portion of a grooved hardboard panel.

With reference to FIG. 6 there is illustrated a portion of a panel 110 having tiles 112 defined therein by grooves 114; a design has been shown on certain of the tiles 112 by way of illustration.

Figure 7:
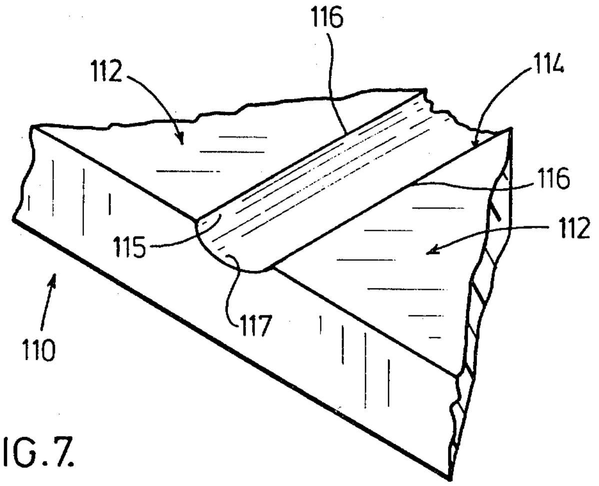
FIG. 7 is a detail of a groove in the panel of FIG. 6.

With reference to FIG. 7 a groove 114 is cut to define adjacent tile portions 112.

On application of an undercoat to the board 110, the wet undercoat composition tends to flow downwardly to expose the board 110 at the upper wall 115 adjacent upper edge 116, and to fill the lower portion 117 of the groove 114.

This invention is illustrated by reference to the following Examples which are not to be construed as limiting.

EXAMPLE 1

A hardboard panel 4 ft. by 8 ft. having a thickness of ⅛ inch was roller coated with a fill coat of formulation A below. The fill coating was dried in a hot air oven at 150° F. for one minute and the resulting coated surface was sanded to provide a smooth surface which was then curtain coated with a base coat of formulation B below, the base coat was dried in a hot air oven at 375° F. for 2 minutes.

The resulting base coat was printed with a repeating pattern to define a plurality of tiles using a silk screen and an ink made up of formulations C and D below to which was added 3% by weight of Bayer Silicone Fluid PL (trademark for a phenyl methyl siloxane available from Bayer Dyestuffs & Chemicals Ltd.); the ink pattern was composed of ink lines having a width of about ⅛ inches which defined eight rows of six inch squares, each row having sixteen squares; the ink lines of the pattern defined each square and a design on each square.

The ink pattern was allowed to stand for 3 to 5 minutes to dry the ink. The resulting panel was passed through a curtain coater and the base coat and inked pattern was coated to a thickness of about 5 wet mils with a top coat composition of formulation E below, which was made up of components (a) and (b), the components having been mixed just prior to their introduction into the curtain coater.

The top coat was repelled by the ink pattern and ridges were formed alongside the ink pattern having a height thickness of about 8 wet mils.

The top coat was dried by heating at 140° F. for 2 minutes to drive off the solvent and the resulting panel was baked at 250° F. for 2.5 to 3 minutes to harden the top coat.

The ceramic effect in the resulting panel was apparent both visually and by feel. The ridges adjacent the ink pattern were found to have a height thickness of 4.5 to 5 dry mils.

| | |
|---|---|
| Formulation A. | |
| A 34 gallon quantity was made up of | |
| *Beckosol 12-006 (phenolated, phthalic free resin modified alkyd resin available from Reichhold Chemical Inc) | 150 lbs |
| Barytes (barium sulphate) X5R* available Canadian Titanium Co. | 430 lbs |
| Tioxide RHD-3* (titanium dioxide pigment available from Tioxide of Canada Ltd.) | 120 lbs |
| Super Hi-Flash*, a naphtha aromatic solvent available from Camsco Solvents & Chemical Co. Ltd. | 54 lbs |
| Cellosolve* Acetate (mono and dialkyl ethers of ethylene glycol) | 5.7 lbs |
| Lead Nuodex* | 1 lb 14 oz |
| Manganese Nuodex* | 12½ oz |
| Cobalt Nuodex* (metal soaps of organic acids available from Nuodex Products Co. Ltd.) | 1 lb 9 oz |
| Formulation B. | |
| A 264 gallon quantity was made up of | |
| Tioxide RHD-3* | 630 lbs |
| Blancfixe* (a precipitated barium sulphate extender pigment available from Prescott Co. Ltd) | 1,722 lbs |
| Dry Ultra Blue | 15 oz |
| Aroplaz EP-1537-1* (alkyd resin in a solvent available from Ashland Oil Canada Ltd) | 903 lbs |
| Xylol | 252 lbs |
| Toluol | 150 lbs |
| The above was ground and mixed well. | |
| Triethylamine | 1 lb 5 oz |
| Resimene U-901* (A melamine and urea formaldehyde resin in organic liquid solvent) | 378 lbs |
| Resimene 875* (available from Monsanto Chemicals Ltd) | 51 lbs |
| Toluol | 102 lbs |
| Formulation C. | |
| A 0.5 gallon quantity of this ink base (without colourant) was made up of | |
| Vinoflex MP-400* (vinyl chloride - vinyl butyl ether copolymer B.A.S.F. Co. Ltd.) | 33.5 lbs |
| Sextone* | 40 lbs |
| Isophorone | 24 lbs |
| Formulation D. | |
| A 2 gallon quantity of ink colouring for addition to formulation C was made up of | |
| Clear Base T-3120* (40% solution of Vinoflex MP-400* in cyclohexanone solvent, from J. J. Barker Co. Ltd.) | 20 lbs |
| Rioxide RHD-3* | 3 lbs 13 oz |
| Blancfixe* | 4 lbs 13 oz |
| Iron Blue 3200* (iron oxide pigment, Imperial Color Corp.) | 13 oz |
| Mapico* Black (oxide of iron City Service Chemicals) | 3.25 oz |
| Formulation E. | |
| A 6.5 gallon quantity was made up of components (a) and (b) | |
| Component (a) | |
| Aroflint* 607 (polyester resin Ashland Oil Canada Ltd.) | 20 lbs 14 oz |
| Xylol | 5.75 lbs |
| Cellosolve* Acetate | 2 lbs 14 oz |
| White Colourant T-3104 21* (titanium dioxide color paste of J. J. | 21 oz |

-continued

| | |
|---|---|
| Barker Co. Ltd.) | |
| Component (b) | |
| Aroflint 404* (oxirane modified ester resin, Ashland Oil Canada Ltd.) | 37.75 lbs |

*trademark

The simulated ceramic panel prepared above was cut to provide two samples for test purposes; sample 1 measuring 12×12 inches and sample 2 measuring 4×8 inches.

The following tests were carried out and the results observed.

(a) Cold Check:

Sample 1 was placed in an oven at 105° F. for 1 hour and then transferred to a freezer for 1 hour at 6° F. The procedure was repeated for 10 cycles. The sample was brought to room temperature and examined for surface defects such as cracking, crazing, etc.

Adhesion of coating was also checked.

Results: no apparent defects.

Adhesion: excellent.

(b) Gloss: Standard gloss meter 60° reading 90+%.

(c) Humidity Resistance: (Q-Panel Company, Cyclic Environmental Tester No. 7-203-D)

Sample 2 was exposed in the tester, coated surface down. The edges of the sample were sealed to prevent water absorption in the board; and only the surface to be tested is in contact with water vapor.

A cycle consists of 1½ hours Wet (Condensation) followed by 1½ hours Dry (Warm Air).

Temperature Range: 80° F. to 120° F.

The cycle is repeated 24 hours/day, 5 days/week.

Test period: 4 months.

Results: No apparent failure.

(d) Adhesion: Eleven vertical and eleven horizontal lines are scored into a portion of the coated surface of sample 1 with a blade so as to form 100 squares approximately 1/16"×1/16" each.

Marking tape was firmly applied to the scored surface and pulled swiftly off. The precentage of adhesion is calculated by the number of squares remaining on the coated surface.

Results: 95–100%.

(e) Taber Abrasion Test: CS-10 wheel, 1000 gram load, 1000 cycles.

After every 200 cycles the weight of coating lost, (in milligrams) was measured.

| Cycles | Sample 1 MQ. Lost | Sample 2 MQ. Lost | Average MQ. Lost |
|---|---|---|---|
| 200 | 6 | 17 | 11.5 |
| 400 | 23 | 37 | 30 |
| 600 | 40 | 57 | 48.5 |
| 800 | 59 | 77 | 68 |
| 1000 | 79 | 94 | 86.5 |

(f) Chemical Resistance:

3 to 4 drops of various reagents were deposited on coated sample surface and each is covered with a watchglass, left for 4 hours and then washed off with water. Sample is left to dry for one hour at room temperature and then examined for staining, softening of coating, etc.

(Rating is 1 to 10, 10 high)

| Reagent | Result | Rating |
|---|---|---|
| Sodium Hydroxide 5% | No effect | 10 |
| Citric Acid 5% | " | 10 |
| Acetic Acid 5% | " | 10 |
| Hydrochloric Acid 5% | " | 10 |
| Bleach (Javex) | " | 10 |
| Mercurochrome | " | 10 |
| Mineral Spirits | " | 10 |
| Cellosolve Acetate | Film softened Ink partially dissolved | 5 |
| Furniture Cleaner | No effect | 10 |
| Alcohol | " | 10 |
| Coffee | " | 10 |
| Grease | " | 10 |
| Lipstick | " | 10 |
| Shoe Polish | Stains | 3 |
| Detergent | No effect | 10 |
| Water | " | 10 |
| Lemon Juice | " | 10 |
| Mustard | " | 10 |
| Grape Juice | " | 10 |

(g) Hardness: Sward Hardness Tester (Standard test procedure,—plate glass=100)

Two samples of top coat (Formulation E) were prepared, a 1.5 wet mil thickness draw-down on glass, and a 4.0 wet mil thickness draw-down on glass.

Each sample was baked for 4 minutes at 250° F. and the hardness measured. The samples were then allowed to remain at room temperature for 2 weeks and the hardness measured again.

| | | Sward Hardness | |
|---|---|---|---|
| | Results | 1.5 Wet Mil Sample | 4.0 Wet Mil Sample |
| a. | 4 mins at 250° F. | 33 | 25 |
| b. | After 2 weeks at room temperature | 50, 52, 48 Average: 50 | 42, 44, 42 Average: 42± |

EXAMPLE 2

A hardboard panel was treated in a manner similar to Example 1, employing the same chemical formulations in a continuous in-line process in which the hardboard panel was passed on a conveyor through the various treatment stages at a rate of 42 ft/min. The base coat was printed with a pattern of ink lines using a gravure printing roll, after which the board was pre-heated to a surface temperature of 105° F. in electric ovens.

On emerging from the electric ovens the pre-heated panel was passed through a curtain coater where it was coated with 4 wet mils of the white pigmented liquid top coat composition.

The repelling of the liquid top coat composition began within 7 to 10 seconds after application of the top coat.

The panel was then passed through a four-section gas-fired oven employing high velocity hot air at a temperature ranging from 250° F. at the inlet end to 325° F. at the outlet end for 3 min. 20 secs.

There was thus obtained a panel of simulated tiles on a continuous in-line equipment.

EXAMPLE 3

A hardboard sheet was passed through a scoring machine to produce score lines to imitate individual tiles such as 4×8 inch. The depth and contour of the scored groove was controlled by the scoring tool used, which had a chiseling effect and the scored board was passed for fill coat.

A heavily pigmented two-component urethane-forming coating composition was applied to the scored board by curtain coater at 1.5–1.6 mils wet thickness, the viscosity of the coating composition was 45–50 sec. No. 4 Ford cup.

The thus formed coating was cured by passing the coated board into a curing chamber having a gas atmosphere of triethylamine, which acts as a catalyst; cure was effected in 15 to 20 secs. exposure.

There was thus obtained a completely coated board having a smooth sealed surface with imperfections in the board being filled.

The grooves are also sealed in this operation so that when the basecoat is applied in the next operation it does not penetrate into the board.

There was no exposure of the board, and the grooves were not filled by the coating composition.

The board was sanded and a pigmented two-component urethane-forming composition was applied as a basecoat by curtain coater at 1.5–1.6 mils wet thickness. The viscosity was 45–50 sec. No. 4 Ford cup; the coated board was passed through a curing chamber having a gas atmosphere of triethylamine, and the exposure time was 15–20 sec.

There is thus obtained a grooved board having a base coat providing a coloured, printable base.

The base coated board was printed with a repeating pattern, so that each pattern was associated with one of the 4×8 inch rectangular areas, using a silk screen and an ink of the formulations described in Example 1.

The resulting panel was passed through a curtain coater following employing the procedure of Example 2 and the formulation of Example 1.

There was thus obtained a grooved panel of simulated tiles on a continuous in-line equipment.

We claim:

1. A decorative simulated ceramic tile comprising a substrate having a surface coated with an under-coat effective to provide a coloured, printable base; an inked layer comprising a layer of coloured ink lines of a silicone-containing ink forming a printed pattern on said printable base, said printed pattern being clearly visible; and a colouring pigment-containing top coat of a hard resinous, substantially silicone-free film-forming material, said top coat containing about 1% to about 4% by weight of said pigment; said top coat having a variable height thickness defining a contour of valleys, hills, and plains, wherein the intensity of colour in the top coat varies with the variation in the contour, the valleys having a top coat thickness less than 1 mil and occurring over said ink lines such that the colour of the ink is not obscured, and the hills lying adjacent said ink lines, said colour in the top coat providing a contrast with the colour in the under-coat and with the colour in the printed pattern, the silicone content of said inked layer being sufficient to repel said top coat to create the ceramic effect without deleteriously affecting the adherence of said top coat.

2. A tile according to claim 1, wherein said ink is based on a copolymer of vinyl chloride and vinyl-butyl ether and said silicone is a phenyl methyl siloxane.

3. A tile according to claim 1, wherein said ink lines have a width of 1/16 to 3/16 inches.

4. A tile according to claim 1, wherein the silicone content of said silicone-containing ink is from 0.75 to 5% by weight.

5. A panel defining a plurality of decorative simulated ceramic tiles comprising a substrate having a surface coated with an under-coat effective to provide a coloured, printable base; a printed ink layer comprisng a layer of coloured ink lines of silicone-containing ink defining a plurality of individual complete designs on said printable base, each of said designs being associated with a defined rectangular area, said layer of ink lines being clearly visible; and a colouring pigment-containing top coat of a hard resinous, substantially silicone-free film-forming material, said top coat containing about 1% to about 4% by weight of said pigment; said top coat having a variable depth and defining a contour of valleys, hills, and plains, wherein the intensity of colour in the top coat varies with the variation in the contour; the valleys having a top coat thickness less 1 mil and occurring over said ink lines such that the colour of the ink is not obscured, and the hills lying adjacent said ink lines; said colour in the top coat providing a contrast with the colour in the under-coat and with the colour in the printed pattern, the silicone content of said inked layer being sufficient to repel said top coat to create the ceramic effect without deleteriously affecting the adherence of said top coat.

6. A panel according to claim 5, wherein said patterns are substantially identical whereby a repeating pattern is produced.

7. A panel according to claim 6, wherein said ink lines have a width of about 1/16 to 3/16 inches.

8. A panel according to claim 5, wherein each of said rectangular areas is a square of identical area.

9. A panel according to claim 5, wherein said rectangular areas are defined by grooves formed in the substrate, said under-coat comprising a urethane coating rapidly cured in the presence of a tertiary amine catalyst.

10. The panel according to claim 5, wherein the silicone content of said silicone-containing ink is from 0.75 to 5% by weight.

11. A panel defining a pluralty of decorative simulated ceramic tiles comprising a substrate having a flat surface coated with an under-coat effective to provide a coloured, printable base; a printed ink layer comprising coloured ink lines of a silicone-containing ink; said ink lines dividing the base into a plurality of rectangular areas and defining a plurality of individually complete designs on said printable base, each of said designs being associated with one of said rectangular areas, said layer of ink lines being clearly visible; and a colouring pigment-containing top coat of a hard resinous, substantially silicone-free film-forming material, said top coat containing about 1% to about 4% by weight of said pigment; said top coat having a variable depth and defining a contour of valleys, hills, and plains, wherein the intensity of colour in the top coat varies with the variation in the contour; said valleys having a top coat thickness less than 1 mil and occurring over said ink lines such that the colour of the ink is not obscured, and the hills lying adjacent said ink lines; said colour in the top coat providing a contrast with the colour in the under-coat and with the colour in the printed pattern, the silicone content of said inked layer being sufficient to repel said top coat to create the ceramic effect without deleteriously affecting the adherence of said top coat.

12. A panel according to claim 11, wherein said patterns are substantially identical whereby a repeating pattern is produced.

13. A panel according to claim 11, wherein each of said rectangular areas is of identical area.

14. A panel according to claim 12, wherein said ink lines have a width of about 1/16 to 3/16 inches.

15. The panel according to claim 11, wherein the silicone content of said silicone-containing ink is from 0.75 to 5% by weight.

* * * * *